(12) United States Patent
Sim et al.

(10) Patent No.: US 12,375,662 B2
(45) Date of Patent: Jul. 29, 2025

(54) METHOD AND APPARATUS FOR ENCODING AND DECODING VIDEO USING SUB-PICTURE PARTITIONING

(71) Applicants: Hyundai Motor Company, Seoul (KR); Kia Corporation, Seoul (KR); Kwangwoon University Industry-Academic Collaboration Foundation, Seoul (KR)

(72) Inventors: Dong Gyu Sim, Seoul (KR); Han Sol Choi, Gyeonggi-do (KR); Sea Nae Park, Seoul (KR); Seung Wook Park, Gyeonggi-do (KR); Wha Pyeong Lim, Gyeonggi-do (KR)

(73) Assignees: Hyundai Motor Company, Seoul (KR); Kia Corporation, Seoul (KR); Kwangwoon University Industry-Academic Collaboration Foundation, Seoul (KR)

( * ) Notice: Subject to any disclaimer, the term of this patent is extended or adjusted under 35 U.S.C. 154(b) by 241 days.

(21) Appl. No.: 17/634,175

(22) PCT Filed: Aug. 10, 2020

(86) PCT No.: PCT/KR2020/010558
§ 371 (c)(1),
(2) Date: Feb. 9, 2022

(87) PCT Pub. No.: WO2021/029640
PCT Pub. Date: Feb. 18, 2021

(65) Prior Publication Data
US 2022/0321884 A1 Oct. 6, 2022

(30) Foreign Application Priority Data

Aug. 9, 2019 (KR) ................. 10-2019-0097448
Sep. 30, 2019 (KR) ................. 10-2019-0120805
Aug. 10, 2020 (KR) ................. 10-2020-0099998

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/176* (2014.11); *H04N 19/70* (2014.11)

(58) Field of Classification Search
CPC .. H04N 19/119; H04N 19/105; H04N 19/176; H04N 19/70; H04N 19/172; H04N 19/174; H04N 19/46
(Continued)

(56) References Cited

U.S. PATENT DOCUMENTS

2021/0337198 A1* 10/2021 Wang ................. H04N 19/137
2022/0094909 A1* 3/2022 Hannuksela ......... H04N 19/174

FOREIGN PATENT DOCUMENTS

WO 2014-197428 A1 12/2014

OTHER PUBLICATIONS

Examiner Hannuksela et al. ("AHG12: Sub-picture-based picture partitioning and decoding", JVET-N0046, Mar. 13, 2019). (Year: 2019).*
(Continued)

*Primary Examiner* — Matthew K Kwan
(74) *Attorney, Agent, or Firm* — Fox Rothschild LLP

(57) ABSTRACT

A method is configured to process a bitstream generated by encoding a sequence of pictures partitioned into a plurality of subpictures. The method includes steps of: decoding, from the bitstream, partitioning information indicating a partitioning structure in which the pictures belonging to the sequence are partitioned into the subpictures; decoding ID
(Continued)

information for the subpictures and mapping an ID to each of the subpictures by using the ID information; and reconstructing blocks within at least one subpicture by using the mapped ID.

8 Claims, 10 Drawing Sheets

(51) Int. Cl.
    *H04N 19/176*     (2014.01)
    *H04N 19/70*     (2014.01)

(58) Field of Classification Search
    USPC ..................................................... 375/240.02
    See application file for complete search history.

(56) References Cited

OTHER PUBLICATIONS

Hannuksela, Miska M. et al. AHG12: Sub-picture-based picture partitioning and decoding. Joint Video Experts Team (JVET) of ITU-T SG 16 WP 3 and ISO/IEC JTC 1/SC 29/WG 11. [Document: JVET-N0046 (Version 1)]. 14th Meeting: Geneva, CH. pp. 1-4, Mar. 13, 2019. [Retrieved on Oct. 7, 2020]. Retrieved from <<http://phenix.int-evry.fr/jvet/>>. See pp. 1-2.

Rosewarne, C. et al. High Efficiency Video Coding (HEVC) Test Model 16 (HM 16) Improved Encoder Description Update 10. Joint Collaborative Team on Video Coding (JCT-VC) of ITU-T SG16 WP3 and ISO/IEC JTC1/SC29/WG11. [Document: JCTVC-AI1002 r1 (Version 2)]. 35th Meeting: Geneva, CH. pp. 1-66, Jul. 9, 2019. [Retrieved on Aug. 19, 2020]. Retrieved from <<http://phenix.it-sudparis.eu/jet/>>. See pp. 7-11.

Bross, Benjamin et al. Versatile Video Coding (Draft 6). Joint Video Experts Team (JVET) of ITU-T SG 16 WP 3 and ISO/IEC JTC 1/SC 29/WG 11. [Document: JVET-O2001-vE (Version 14)]. 15th Meeting: Gothenburg, SE. pp. 1-439, Jul. 31, 2019. [Retrieved on Oct. 6, 2020]. Retrieved from <<http://phenix.int-evry.fr/jvet/>>. See pp. 21-24.

Chen, Jianle et al. Algorithm description for Versatile Video Coding and Test Model 5 (VTM 5). Joint Video Experts Team (JVET) of ITU-T SG 16 WP 3 and ISO/IEC JTC 1/SC 29/WG 11. [Document: JVET-N1002-v2]. 14th Meeting: Geneva, CH. pp. 1-76, Jun. 11, 2019. [Retrieved on Oct. 6, 2020]. Retrieved from <<http:/phenix.int-evey.fr/veti>>. See pp. 8-11.

\* cited by examiner

0

1

2

3

4

5

(A)

(B)

METHOD AND APPARATUS FOR ENCODING AND DECODING VIDEO USING SUB-PICTURE PARTITIONING

CROSS-REFERENCE TO RELATED APPLICATION(S)

This application is a U.S. National Phase of PCT International Application No. PCT/KR2020/010558 filed on Aug. 10, 2020, which claims under 35 U.S.C. § 119(a) the benefit of Korean Patent Application No. 10-2019-0097448 filed on Aug. 9, 2019, Korean Patent Application No. 10-2019-0120805 filed on Sep. 30, 2019, and Korean Patent Application No. 10-2020-0099998 filed on Aug. 10, 2020, the entire contents of which are incorporated herein by reference.

BACKGROUND

(a) Technical Field

The present disclosure relates to encoding and decoding of a video, more particularly, to partitioning of each picture into independently displayable subpictures and encoding and decoding of each subpicture.

(b) Description of the Related Art

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the size, resolution, and frame rate of video images are gradually increasing, and thus the amount of data to be encoded is also increasing. Accordingly, a new compression technique having better encoding efficiency and higher image quality than the existing compression technique is required.

In addition, due to the advent of various applications such as 360 video, a technology for not only displaying the entire area of a decoded picture but also a partial area of the picture is required.

SUMMARY

The present disclosure is directed to a technique for partitioning each picture into subpictures that can be displayed independently from each other, and a technique for encoding and decoding each subpicture.

In accordance with one aspect of the present disclosure, provided is a method for processing a bitstream generated by encoding a sequence of pictures partitioned into a plurality of subpictures. The method comprises: decoding, from the bitstream, partitioning information indicating a partitioning structure in which the pictures belonging to the sequence are partitioned into the subpictures; decoding ID information for the subpictures, and mapping an ID to each of the subpictures by using the ID information; and reconstructing blocks within at least one subpicture by using the mapped ID.

The partitioning structure defined by the partitioning information may be identical for all the pictures in the sequence. The ID information may be constructed to allow for mapping of different IDs to co-located subpictures within the pictures belonging to the sequence.

In accordance with another aspect of the present disclosure, provided is a video encoding method for generating a bitstream by encoding a sequence of pictures partitioned into a plurality of subpictures. The method comprises: encoding partitioning information for indicating a partitioning structure in which the pictures belonging to the sequence are partitioned into the subpictures; encoding ID information for the subpictures; and encoding blocks within at least one subpicture by using mapped ID.

The partitioning structure defined by the partitioning information may be identical for all the pictures in the sequence. The ID information is constructed to allow for mapping of different IDs to co-located subpictures within the pictures belonging to the sequence.

DETAILED DESCRIPTION

Figure 1:
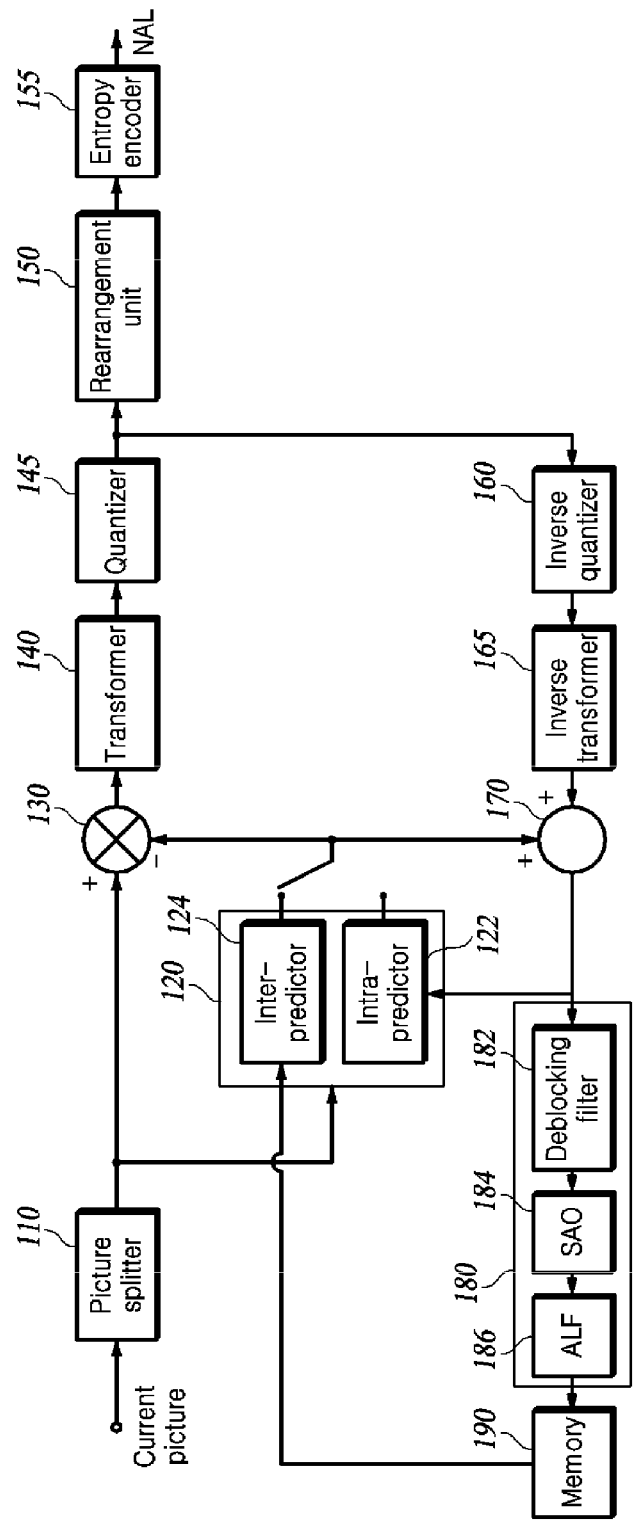
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in assigning reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a picture splitter 110, a predictor 120, a subtractor 130, a transformer 140, a quantizer 145, a reorganizer 150, an entropy encoder 155, an inverse quantizer 160, an inverse transformer 165, an adder 170, a loop filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video includes a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting one or more pictures is encoded in a picture parameter set (PPS) or a picture header. Furthermore, information which a sequence composed of a plurality of pictures refers to in common is encoded in a sequence parameter set (SPS). Information applied to one tile or tile group in common may be encoded as a syntax of a tile or tile group header.

The picture splitter 110 determines the size of a coding tree unit (CTU). Information about the size of the CTU (CTU size) is encoded as a syntax of the SPS or PPS and is transmitted to the video decoding apparatus.

The picture splitter 110 splits each picture constituting the video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Here, BTTT may be collectively referred to as a multiple-type tree (MTT).

Figure 2:
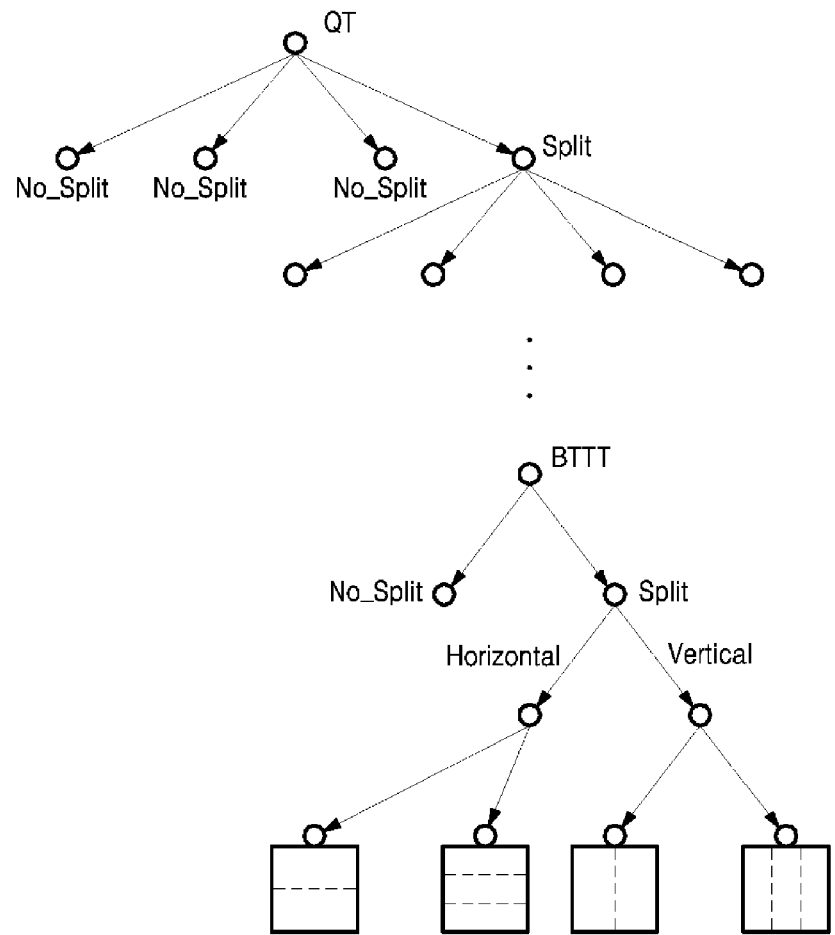
FIG. 2 is a diagram illustrating block splitting using a QTBTTT structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124.

Figure 3:
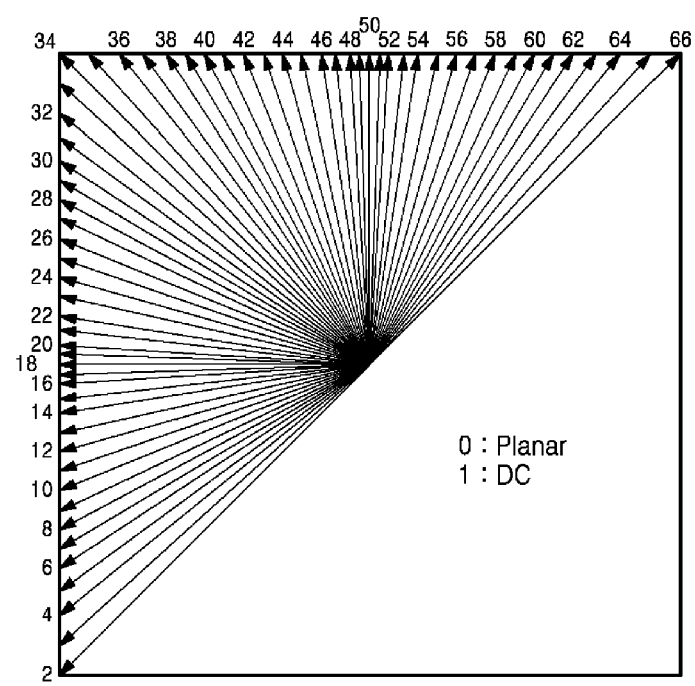
FIG. 3 is a diagram illustrating a plurality of intra-prediction modes.

The intra-prediction unit 122 predicts pixels in the current block using pixels (reference pixels) positioned around the current block in the current picture including the current block. There is a plurality of intra-prediction modes according to the prediction directions. For example, as shown in FIG. 3, the plurality of intra-prediction modes may include two non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixels) and an equation determined according to the selected intra-prediction mode. Information about the selected intra-prediction mode is encoded by the entropy encoder 155 and transmitted to the video decoding apparatus.

The inter-predictor 124 generates a prediction block for the current block through motion compensation. The inter-predictor 124 searches for a block most similar to the current block in a reference picture which has been encoded and decoded earlier than the current picture, and generates a prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus. The inter-predictor 124 may perform interpolation on a reference picture or a reference block in order to increase the accuracy of prediction. That is, subpixels between two consecutive integer pixels are interpolated by applying filter coefficients to a plurality of consecutive integer pixels including the two integer pixels. When a process of searching for a block that is most similar to the current block for the interpolated reference picture is performed, the motion vector may be expressed not to the precision of the integer pixel but to the precision of the decimal unit. The precision or resolution of the motion vector may be set differently for each unit of a target region to be encoded, such as a slice, tile, CTU, or CU.

The subtractor 130 subtracts the prediction block generated by the intra-predictor 122 or the inter-predictor 124 from the current block to generate a residual block.

The transformer 140 may split the residual block into one or more subblocks, and applies the transformation to the one or more subblocks, thereby transforming the residual values of the transform blocks from the pixel domain to the frequency domain. In the frequency domain, the transformed blocks are referred to as coefficient blocks or transform blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like.

The transformer 140 may transform residual signals in the residual block, using the entire size of the residual block as a transform unit. Alternatively, the residual block may be partitioned into a plurality of subblocks and the residual signals in a subblock may be transformed using the subblock as a transform unit.

The transformer 140 may individually transform the residual block in a horizontal direction and a vertical direction. For transformation, various types of transform functions or transform matrices may be used. For example, a pair of transform functions for transformation in the horizontal direction and the vertical direction may be defined as a multiple transform set (MTS). The transformer 140 may select one transform function pair having the best transform efficiency in the MTS and transform the residual block in the horizontal and vertical directions, respectively. Information (mts_idx) on the transform function pair selected from the MTS is encoded by the entropy encoder 155 and signaled to the video decoding apparatus.

The quantizer 145 quantizes transform coefficients output from the transformer 140 using quantization parameters, and outputs the quantized transform coefficients to the entropy encoder 155. For some blocks or frames, the quantizer 145 may directly quantize a related residual block without transformation. The quantizer 145 may apply different quantization coefficients (scaling values) according to positions of the transform coefficients in the transform block. A matrix of quantization coefficients applied to quantized transform coefficients arranged in two dimensions may be encoded and signaled to the video decoding apparatus.

The reorganizer 150 may reorganize the coefficient values for the quantized residual value. The reorganizer 150 may change the 2-dimensional array of coefficients into a 1-dimensional coefficient sequence through coefficient scanning. For example, the reorganizer 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. That is, a scan mode to be used may be determined among the zig-zag scan, the diagonal scan, the vertical scan and the horizontal scan according to the size of the transformation unit and the intra-prediction mode.

The entropy encoder 155 encodes the one-dimensional quantized transform coefficients output from the reorganizer 150 using uses various encoding techniques such as Context-based Adaptive Binary Arithmetic Code (CABAC) and exponential Golomb, to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction, and encodes intra-prediction information (i.e., information about an intra-prediction mode) or inter-prediction information (information about a reference picture index and a motion vector) according to the prediction type. In addition, the entropy encoder 155 encodes information related to quantization, that is, information on quantization parameters and information on a quantization matrix.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference pixels in performing intra-prediction of a next block.

The loop filter unit 180 filters the reconstructed pixels to reduce blocking artifacts, ringing artifacts, and blurring artifacts generated due to block-based prediction and transformation/quantization. The loop filter unit 180 may include one or more of a deblocking filter 182, a sample adaptive offset (SAO) filter 184, or an adaptive loop filter (ALF) 186.

The deblocking filter 182 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed pixel and an original pixel caused by lossy coding, and performs filtering in a manner of adding a corresponding offset to each reconstructed pixel. The ALF 186 performs filtering on a target pixel to be filtered by applying filter coefficients to the target pixel and neighboring pixels of the target pixel. The ALF 186 may divide the pixels included in a picture into predetermined groups, and then determine one filter to be applied to a corresponding group to differentially perform filtering on each group. Information about filter coefficients to be used for the ALF may be encoded and signaled to the video decoding apparatus.

The reconstructed blocks filtered through the loop filter unit 180 are stored in the memory 190. Once all blocks in one picture are reconstructed, the reconstructed picture may be used as a reference picture for inter-prediction of blocks in a picture to be encoded next.

Figure 4:
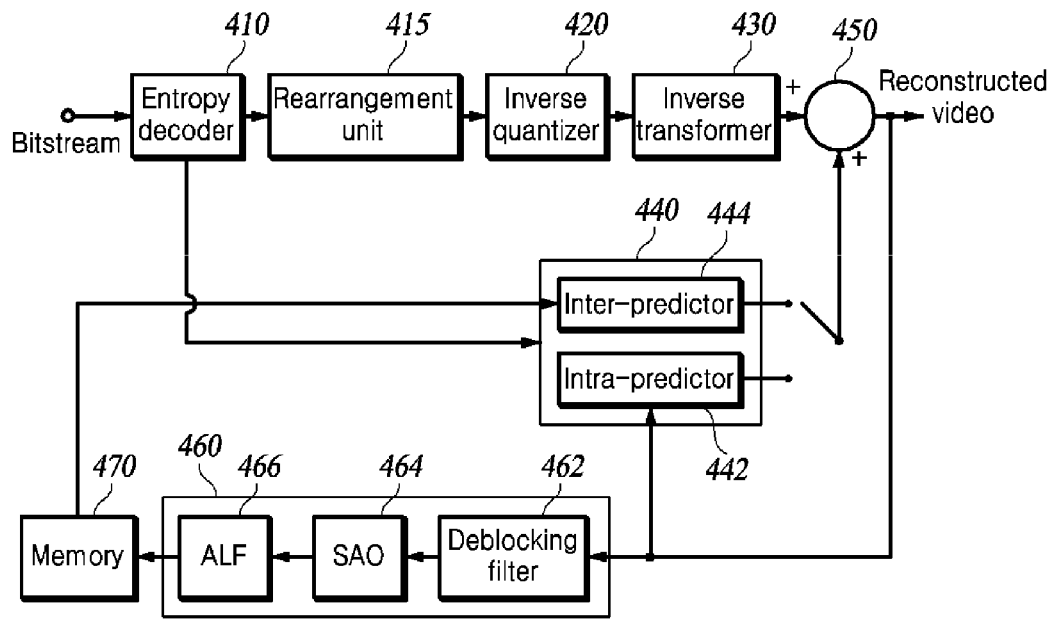
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include an entropy decoder 410, a reorganizer 415, an inverse quantizer 420, an inverse transformer 430, a predictor 440, an adder 450, a loop filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 determines a current block to be decoded by decoding a bitstream generated by the video encoding apparatus and extracting information related to block splitting, and extracts prediction information and information about a residual signal, and the like required to reconstruct the current block.

The entropy decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the CTU is split using the QTBT structure, the first flag (QT_split_flag) related to QT splitting is extracted, and each node is split into four nodes of a lower layer. Then, a split_flag (split_flag) indicating whether a node corresponding to a leaf node of QT is further split in the BT and the splitting direction information are extracted.

Once the current block to be decoded is determined through splitting in the tree structure, the entropy decoder 410 extracts information about a prediction type indicating whether the current block is intra-predicted or inter-predicted. When the prediction type information indicates intra-prediction, the entropy decoder 410 extracts a syntax element for the intra-prediction information (intra-prediction mode) for the current block. When the prediction type information indicates inter-prediction, the entropy decoder 410 extracts a syntax element for the inter-prediction information, that is, information indicating a motion vector and a reference picture referred to by the motion vector.

The entropy decoder 410 also extracts information about quantized transform coefficients of the current block as information related to quantization and information about residual signals.

The reorganizer 415 may change the sequence of the one-dimensional quantized transform coefficients entropy-decoded by the entropy decoder 410 to a 2-dimensional coefficient array (i.e., block) in a reverse order of the coefficient scanning performed by the video encoding apparatus.

The inverse quantizer 420 inversely quantizes the quantized transform coefficients using the quantization parameter. The inverse quantizer 420 may apply different quantization coefficients (scaling values) to the quantized transform coefficients arranged in two dimensions. The inverse quantizer 420 may perform inverse quantization by applying a matrix of quantization coefficients (scaling values) from the video encoding apparatus to a two-dimensional array of quantized transform coefficients.

The inverse transformer 430 inversely transforms the inversely quantized transform coefficients from the frequency domain to the spatial domain to reconstruct residual signals, thereby generating a reconstructed residual block for the current block. In addition, when the MTS is applied, the inverse transformer 430 determines transform functions or transform matrices to be applied in the horizontal and vertical directions, respectively, using the MTS information (mts_idx) signaled from the video encoding apparatus, and uses the determined transform functions to inversely transform the transform coefficients in the transform block in the horizontal and vertical directions.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on the syntax element for the intra-prediction mode extracted from the entropy decoder 410, and predicts the current block using the reference pixels around the current block according to the intra-prediction mode.

The inter-predictor 444 determines a motion vector of the current block and a reference picture referred to by the motion vector using the syntax element for the intra-prediction mode extracted from the entropy decoder 410, and predicts the current block based on the motion vector and the reference picture.

The adder 450 reconstructs the current block by adding the residual block output from the inverse transformer and the prediction block output from the inter-predictor or the intra-predictor. The pixels in the reconstructed current block are used as reference pixels in intra-predicting a block to be decoded next.

The loop filter unit 460 may include at least one of a deblocking filter 462, an SAO filter 464, and an ALF 466. The deblocking filter 462 deblocking-filters the boundary between the reconstructed blocks to remove blocking artifacts caused by block-by-block decoding. The SAO filter 464 performs filtering in a manner of adding the reconstructed block after deblocking filtering to corresponding offsets so as to compensate for a difference between the reconstructed pixel and the original pixel caused by lossy coding. The ALF 466 performs filtering on a target pixel to be filtered by applying filter coefficients to the target pixel and neighboring pixels of the target pixel. The ALF 466 may divide the pixels in a picture into predetermined groups, and then determine one filter to be applied to a corresponding group to differentially perform filtering on each group. The filter coefficient of the ALF is determined based on the information about the filter coefficient decoded from the bitstream.

The reconstructed block filtered through the loop filter unit 460 is stored in the memory 470. When all blocks in one picture are reconstructed, the reconstructed picture is used as a reference picture for inter-prediction of blocks in a picture to be encoded next.

Figure 5:
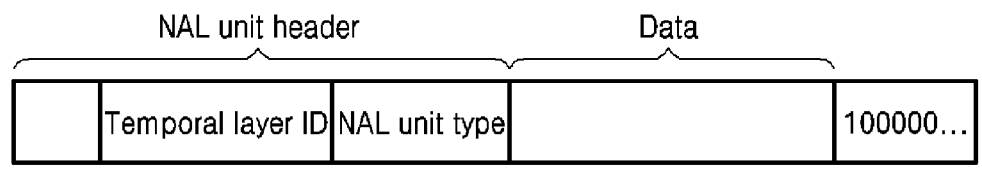
FIG. 5 is an exemplary diagram showing the structure of a bitstream.

As described above, the video encoding apparatus transmits a bitstream containing coded data about a video, and the video decoding apparatus decodes the bitstream to reconstruct each picture constituting the video. The bitstream may be composed of a plurality of transmission units, that is, network abstraction layer (NAL) units. As shown in FIG. 5, a NAL unit may include a NAL unit header and data carried through the NAL unit. In order to match the size of the NAL unit in bytes, a bit may be added to the rear part of the data constituting the NAL unit. The NAL unit header includes a NAL unit type for indicating the type of the data carried through the NAL unit and a temporal layer ID of the NAL unit.

According to the type of data included in the data field, NAL units may be classified into a video coding layer (VCL) type and a non-VCL type. A VCL type NAL unit is a NAL unit containing image data of a group of encoded pixels in the data field, and typically contains data about a coded slice. This means that the unit in which image data are transmitted is a slice. The non-VCL type NAL unit includes parameters necessary for decoding of data of a pixel group in the data field. NAL units including high level syntaxes such as an SPS including parameters shared at the sequence level (hereinafter referred to as a "first parameter set") or a PPS including parameters shared at one or more picture levels (hereinafter referred to as a "second parameter set"), correspond to non-VCL type NAL units. Whether the transmitted NAL unit is related to the first parameter set, the second parameter set, or a coded slice is indicated by the NAL unit type contained in the NAL unit header.

With the advent of various applications such as 360 video, a technology for not only displaying the entire region of a decoded picture but also a partial region of the picture is required. In order to support this technical requirement, another aspect of the present disclosure provides a method of partitioning pictures into a plurality of subpictures and encoding and decoding each subpicture. The present disclosure enables independent encoding or independent transmission of subpictures constituting each picture. In addition, data corresponding to each of the subpictures may be independently extracted or decoded from the entire bitstream. Furthermore, the partitioned subpictures from the picture may be displayed independently of each other.

The video encoding apparatus may encode a flag indicating whether subpicture partitioning is permitted in a video sequence or not. If the flag indicates that subpicture partitioning is permitted, the video encoding apparatus encodes information indicating the layout of subpictures. The video decoding apparatus may identify whether subpicture partitioning is permitted in a video sequence by decoding the flag, and may determine the layout of subpictures within pictures by decoding the layout information.

To represent the layout of subpictures partitioned from a picture, a coding unit group made up of one or more coding units (CU) may be defined. The coding unit group may correspond to a grid of a predefined size, a CTU, slice, or tile according to the purpose and size. The subpictures are defined by one or more coding unit groups.

Figure 6:
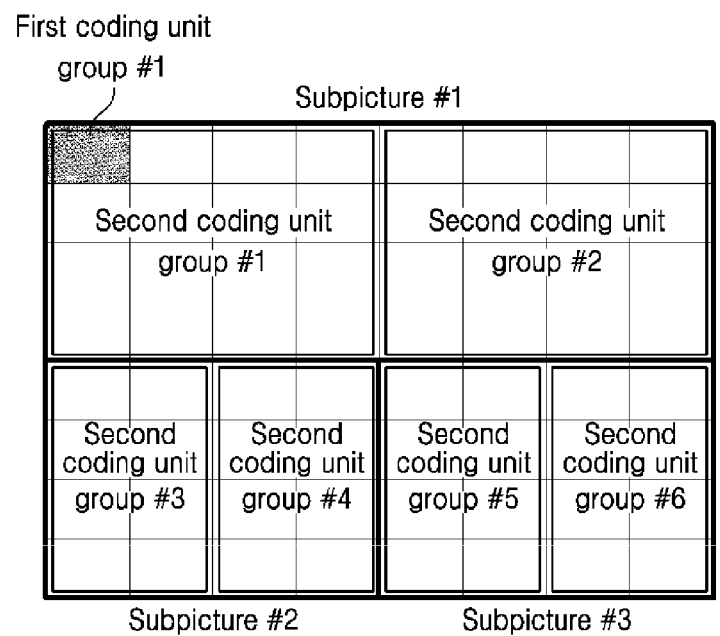
FIG. 6 is one exemplary view for explaining a partitioning structure in which a picture is partitioned into subpictures.

FIG. 6 is one exemplary view for explaining a partitioning structure in which a picture is partitioned into subpictures.

The coding unit groups may be classified as a first coding unit group which is a basic unit of a picture or subpicture and a second coding unit group made up of a plurality of first coding unit groups. For example, the first coding unit group may be a CTU or a grid of a predefined size, and the second coding unit group may be a slice corresponding to a transmission unit or a tile or tile group defined for independent encoding/decoding. A subpicture may be made up of one second coding unit group or a plurality of second coding unit groups.

The video encoding apparatus may signal the size of a first coding unit group (e.g., the horizontal or vertical length of a first coding unit group), the number of the first coding unit groups in a horizontal and/or vertical direction of a picture, and so on, and the video decoding apparatus may recognize the size of the first coding unit group and the size of a picture by using the signaled information.

Layout information of subpictures within a picture may be represented as partitioning information indicating a partitioning structure in which the picture is partitioned into the subpictures, and information indicating the IDs or indices of the subpictures within the picture. The partitioning information for indicating the partitioning structure may be represented based on a first coding group. That is, the partitioning information may be represented by the size of a first coding unit group (e.g., the width and height of a first coding unit group) which is a basic unit of a subpicture, and the number of first coding unit groups in horizontal and vertical directions of the subpicture. Further, the partitioning information may further include identification information for identifying the first coding unit group positioned at the top left and/or bottom right of each subpicture.

Figure 7:
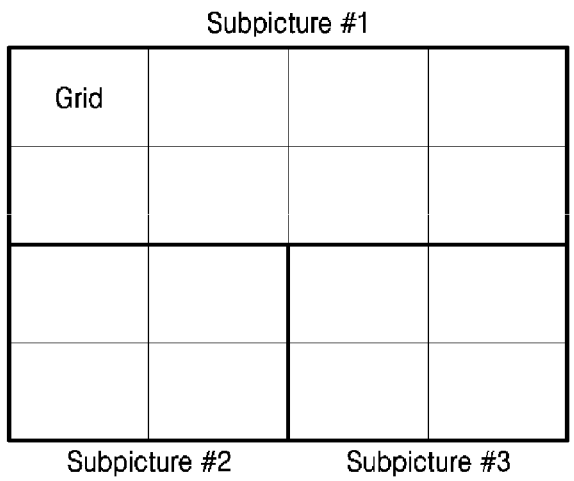
FIG. 7 is another exemplary view for explaining a partitioning structure in which a picture is partitioned into subpictures.

FIG. 7 is another exemplary view for explaining a partitioning structure in which a picture is partitioned into subpictures.

FIG. 7 may correspond to a case where one second coding unit group constitutes one subpicture. That is, in FIG. 7, a grid corresponds to a first coding unit group, and one second coding unit group, which is a set of grids, corresponds to one subpicture.

Like in FIG. 6, the partitioning information in this example may further include the size of grids, which are basic units of a subpicture, the number of grids in horizontal and vertical directions of a subpicture, and identification information for identifying a grid positioned at the top left and/or bottom right of a subpicture.

Alternatively, the partitioning information may be represented as the IDs or addresses of grids constituting a subpicture. To this end, the IDs or addresses of grids within a picture may be assigned in ascending order, starting from 0, according to a specific scan order, for example, a raster scan order.

In the foregoing, a partitioning structure of a subpicture has been defined based on rectangular basic units. However, the partitioning structure of the subpicture may be defined in various forms.

Figure 8:
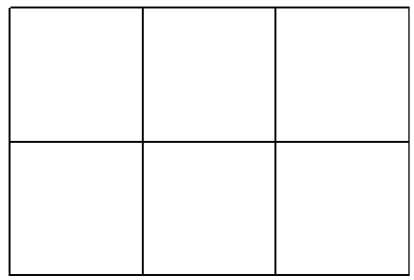
FIG. 8 is yet another exemplary view for explaining a partitioning structure in which a picture is partitioned into subpictures.
Figure 8:
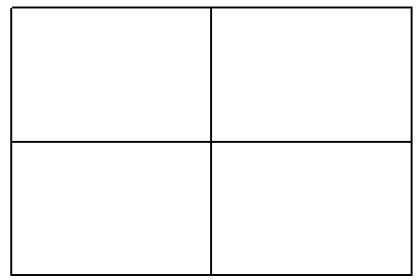
Figure 8:
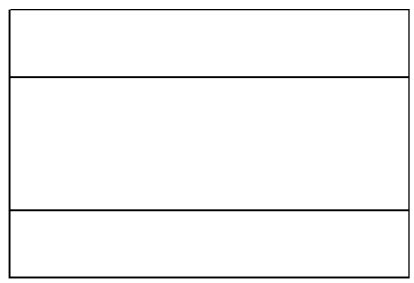
Figure 8:
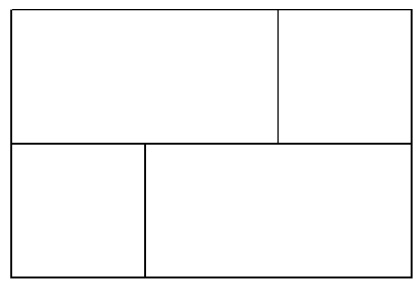
Figure 8:
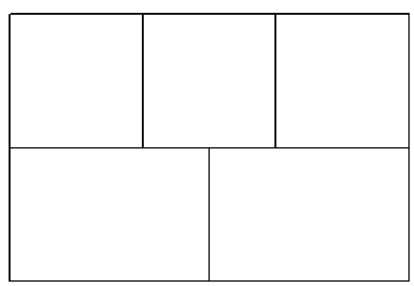
Figure 8:
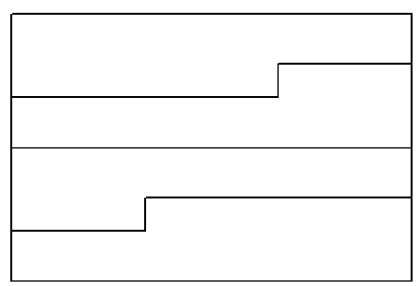

FIG. 8 is yet another exemplary view for explaining a partitioning structure in which a picture is partitioned into subpictures.

In this example, a plurality of partitioning types by which a picture is partitioned into subblocks are predefined. The video encoding apparatus may signal an index indicating any one of the plurality of predefined partitioning types, and the video decoding apparatus may determine the partitioning type by which the picture is partitioned into subblocks, through the index received from the video encoding apparatus.

Figure 9:
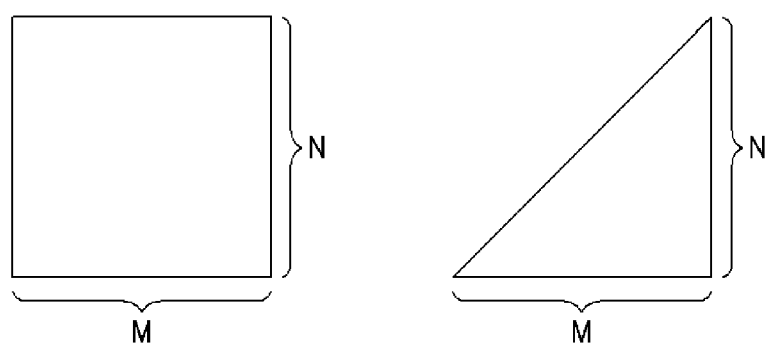
FIGS. 9 and 10 are further exemplary views for explaining a partitioning structure in which a picture is partitioned into subpictures.
Figure 10:
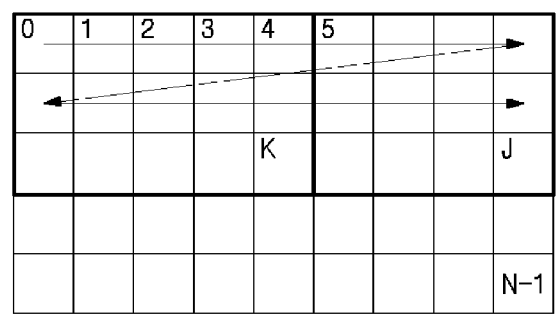
Figure 10:
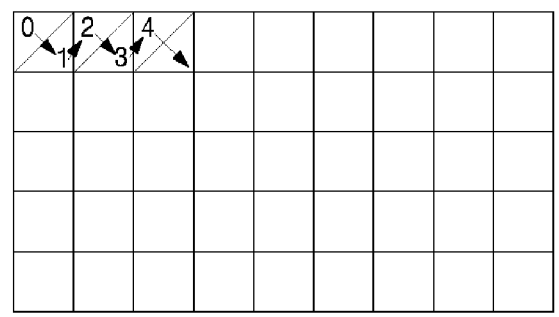

FIGS. 9 and 10 are further exemplary views for explaining a partitioning structure in which a picture is partitioned into subpictures.

In this example, basic units of a subpicture may have various shapes. For example, as illustrated in FIG. 9, the basic units may be rectangular or triangular. The video encoding apparatus signals to the video decoding apparatus an index indicating a basic unit shape to be used, among a plurality of basic unit shapes. Also, it signals information on the size (M and N) of a basic unit shape to be used.

A subpicture partitioning structure may be represented by at least one of the index of a first basic unit of a subpicture, the index of a last basic unit, and the shape of the subpicture. To this end, the indices of the basic units may be assigned according to a predefined scan order. For example, the scan order may be a raster scan order as illustrated in FIG. 10.

As shown in (A) of FIG. 10, if the shape of basic units is rectangular and the shape of a subpicture is rectangular, the structure of the subpicture may be defined merely by the index of the last basic unit of each subpicture. As in (A) of FIG. 10, a first subpicture may be defined by the value of Index K, and a second subpicture may be defined by the value of Index J. The video encoding apparatus signals information on the value K and the value J to the video decoding apparatus. The information on the value J may be represented by a difference with the value K. The video decoding apparatus may acquire the value J by using the transmitted difference and the value K.

Although the drawing illustrates a raster scan order in which the index increases sequentially from the top left to the bottom right, other scan orders may be used. Also, the index may be represented by two values in the horizontal direction (x-axis direction) and vertical direction (y-axis direction). In this case, each subpicture is defined by two-dimensional coordinates of the basic unit. For example, in (A) of FIG. 10, each subpicture is defined by Index 4 in the horizontal direction and Index 2 in the vertical direction, i.e., (4, 2). The video encoding apparatus signals to the video decoding apparatus the indices in the horizontal and vertical directions of the last basic unit of each subpicture within the picture.

Even when the subpictures have other shapes than rectangular, the subpicture partitioning structure may be defined by the index of the last basic unit within each subpicture. For example, if a picture is partitioned in such a manner as in Partitioning Type 5 of FIG. 8, the subpicture partitioning structure may be defined by the index of the last basic unit of each subpicture. For example, a current subpicture is made up of basic units whose index is greater than the index of the last basic unit corresponding to a previous subpicture and equal to or less than the index of the last basic unit corresponding to the current subpicture.

Meanwhile, in the above example, if the number of subpictures within a picture is signaled, index information of the basic unit corresponding to the last subpicture within the picture may be omitted.

The subpicture partitioning structure may be defined in a similar way to the above-described method when the shape of basic units is triangular as shown in (B) of FIG. 10.

Figure 11:
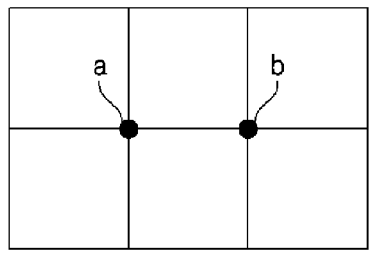
FIG. 11 is a further exemplary view for explaining a partitioning structure in which a picture is partitioned into subpictures.

FIG. 11 is a further exemplary view for explaining a partitioning structure in which a picture is partitioned into subpictures.

In this example, the subpicture partitioning structure is defined, not by using the basic units of the subpictures, but by using location information of pixels within the picture. If a picture is partitioned into six rectangular subpictures as shown in FIG. 11, the partitioning structure may be defined merely by coordinate information of pixels, a and b. If there is a limitation that the size of the subpictures has to be multiples of n, the video encoding apparatus may transmit a value obtained by dividing a pixel coordinate value by n. That is, values corresponding to a/n and b/n are signaled as the coordinate information (a and b) of the pixels. The video decoding apparatus may calculate a and b by multiplying a received value by n. In some embodiments, the coordinate of b may be transmitted in the form of a differential value with the coordinate of a.

The video encoding apparatus transmits, as layout information, information on the above-described partitioning structure (partitioning information) and ID information of the subpictures within the picture to the video decoding apparatus. The video decoding apparatus determines the layout of the subpictures within the picture by using the received layout information. The video decoding apparatus may extract a subpicture ID transmitted on a per slice basis from the video encoding apparatus and thereby find out a subpicture in which a corresponding slice is included. Also, the subpictures are reconstructed by decoding the blocks within one or more slices constituting each subpicture through the above-described decoding process.

As described above, each of a plurality of pictures constituting one video sequence may be partitioned into a plurality of subpictures, and only some subpictures within each of the pictures belonging to one sequence may be extracted and encoded/decoded. Also, only these subpictures may be displayed. Accordingly, this disclosure defines a sub-sequence or sublayer made up only of subpictures at the same location or with the same ID within the respective pictures belonging to one video sequence.

Since one sublayer is required to constitute one piece of content, it would be desirable that the subpictures belonging to the sublayer are related to each other and the subpicture are of the same size. Accordingly, all of the pictures constituting one video sequence may have the same subpicture partitioning structure, and co-located subpictures within the pictures may have the same ID. However, in the case of an application such as user-viewport-based 360-degree video streaming, the IDs of subpictures may be changed within one video sequence depending on the user's viewing orientation. Accordingly, the subpictures with the same ID may be at different locations or be of different sizes, in order to support such an application. In other words, the co-located subpictures within the pictures belonging to one sequence may have different IDs. Therefore, ID information may be signaled in such a way as to allow for mapping of different IDs to the co-located subpictures within the pictures belonging to the sequence.

Hereinafter, a technique for signaling layout information, that is, partitioning information indicating a partitioning structure and/or ID information, will be described.

Information for describing the layout of subpictures may be signaled at a sequence level. That is, partitioning information indicating a subpicture partitioning structure may be signaled at the sequence level. For example, one or more methods may be used: a method of signaling partitioning information in a sequence parameter set (SPS), a method of repeatedly signaling for each picture group or picture belonging to a sequence, and a method of signaling a syntax element (e.g., flag) indicating whether a partitioning structure applies equally to all pictures belonging to a corresponding sequence. For example, a syntax element indicating that a partitioning structure applies equally to all pictures belonging to a corresponding sequence may be signaled, and accordingly partitioning information may be signaled in a sequence parameter set. In this case, the video decoding apparatus decodes the partitioning information from the sequence parameter set and partitions all the pictures belonging to the sequence by the same partitioning structure.

ID information of the subpictures within the pictures may be signaled in the same way as the partitioning information. For example, a syntax element indicating that ID mapping applies equally to all pictures belonging to a corresponding sequence may be signaled, and accordingly ID information may be signaled in a sequence parameter set. In this case, the video decoding apparatus decodes the ID information and maps the same ID to the co-located subpictures within the pictures.

Meanwhile, different subpicture layouts may be used for each picture group belonging to a sequence. Each picture group includes one or more pictures, and the pictures belonging to the same picture group has the same layout. In this case, each piece of information for describing the layout of subpictures may be signaled at a picture group level. For example, one or more methods may be used: a method of signaling information on a partitioning structure in a picture parameter set (PPS), a method of signaling information on a partitioning structure for each picture belonging to a picture group, and a method of signaling a syntax element (e.g., flag) indicating whether a partitioning structure applied on a picture group level applies equally to all pictures belonging to a corresponding picture group.

For example, a syntax element indicating that a partitioning structure (or ID mapping) applies equally to all pictures belonging to a corresponding picture group may be signaled, and partitioning information (or ID information) may be signaled in a picture parameter set. In this case, the video decoding apparatus partitions all the pictures belonging to the picture group by the same partitioning structure (or maps the same ID to the co-located subpictures within the pictures belonging to the picture group). Accordingly, the pictures belonging to different picture groups within a video sequence (i.e., the pictures referring to different picture parameter sets) may have different partitioning structures. Also, different IDs may be mapped to the co-located subpictures within the pictures belonging to different picture groups.

Partitioning information or ID information may be signaled at a picture group level when a syntax element included in an SPS indicates that a partitioning structure or ID mapping does not apply in common to the pictures belonging to the corresponding sequence. For example, partitioning information is signaled at a picture group level when a syntax element on a sequence level indicates that a partitioning structure does not apply equally to the pictures belonging to the corresponding sequence. Likewise, ID information is signaled at a picture group level when a syntax element on a sequence level indicates that ID mapping does not apply equally to the sequence.

Upon receiving a bitstream containing subpicture layout information (partitioning information indicating a subpicture partitioning structure and subpicture ID information) from the video encoding apparatus, the video decoding apparatus may construct a sublayer by extracting subpictures at the same location or with the same ID by using the received layout information.

In some embodiments of the present disclosure, upon receiving a bitstream with an encoded sequence of pictures, the video decoding apparatus may decode and manage the bitstream independently for each sublayer. For example, each sublayer may be decoded in their independent decoding order, and decoded subpictures may be managed for each sublayer. To this end, different decoded picture buffers (DPBs) may be used for each sublayer.

The subpictures may be managed by using a picture ID and a subpicture ID. The subpictures included in the same picture may have the same picture ID, whereas subpictures belonging to different sublayers may have different subpicture IDs. By using a picture ID and a subpicture ID, each sublayer may be configured to have an independent reference structure between subpictures, and may be independently managed through a separate DPB or a separate display buffer. Subpictures may be individually added to or deleted from at least one of a DPB that is managed on a per-sublayer basis or a DPB that is managed on a per-picture basis, and may be outputted for display. The video decoding apparatus may simultaneously display subpictures constituting one picture by using a picture ID, or may individually display each subpicture by using a subpicture ID or information (e.g., subpicture location) that may be derived from the subpicture ID.

Sublayers may have independent reference structures. Accordingly, the reference structure may vary between sublayers.

Figure 12:
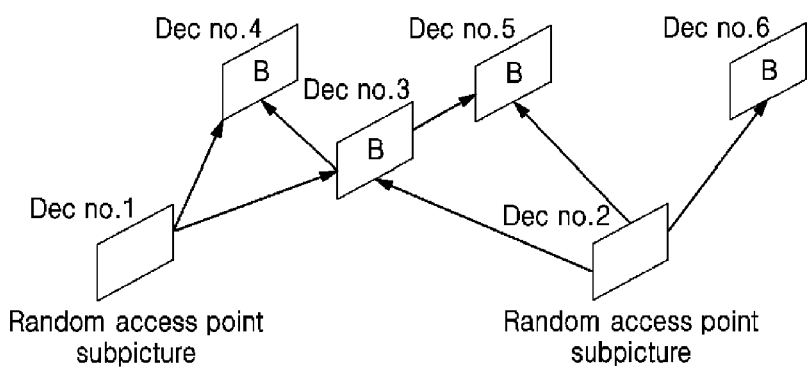
FIG. 12 is one exemplary view showing a reference structure for each sublayer.
Figure 12:
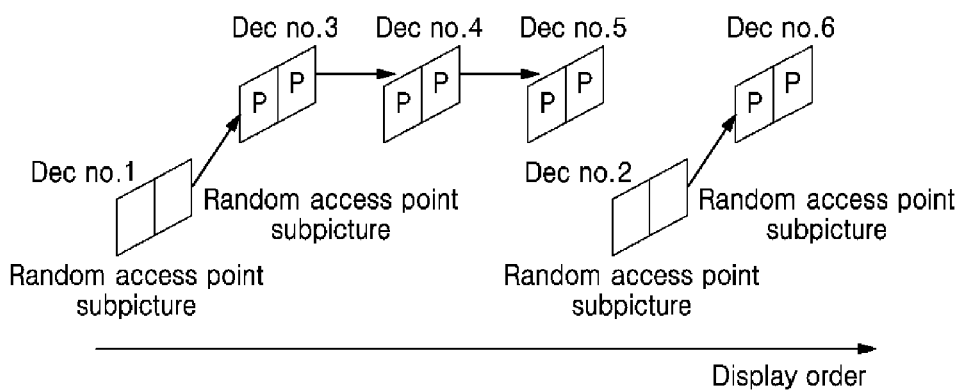

FIG. 12 is one exemplary view showing a reference structure for each sublayer.

For example, as shown in FIG. 12, a display order and/or decoding order of random access point (RAP) subpictures may be same for two sublayers, while the decoding order and/or display order of other subpictures than the random access point subpictures may be different for each sublayer. When displaying a picture made up of multiple subpictures belonging to different sublayers, the displaying of this picture may be delayed in consideration of the reference structure between and/or the encoding/decoding order of subpictures for each sublayer. For example, when simultaneously displaying all subpictures included in each picture, starting from a picture with a specific picture ID, the video decoding apparatus may delay the displaying until all the subpictures with the same picture ID as the random access point subpicture closest in display order to the picture with the specific picture ID have been decoded.

Figure 13:
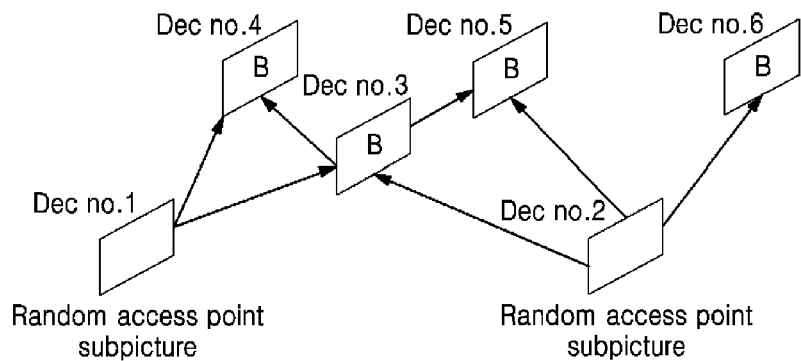
FIG. 13 is another exemplary view showing a reference structure for each sublayer.
Figure 13:
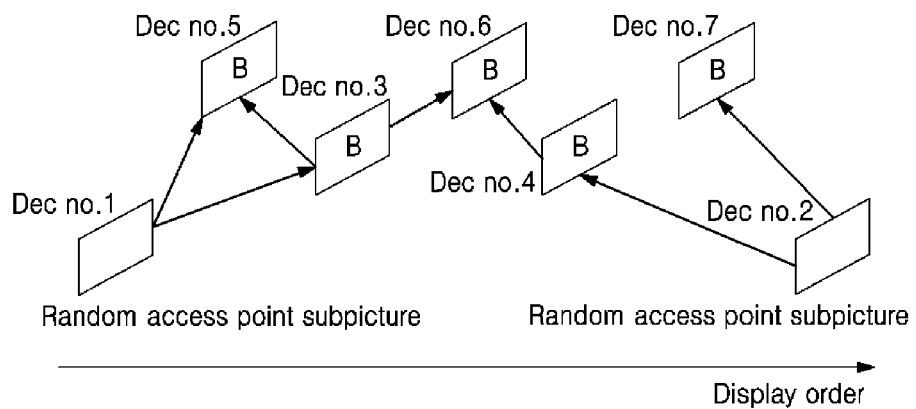

FIG. 13 is another exemplary view showing a reference structure for each sublayer.

As illustrated in FIG. 13, the decoding order and/or display order of random access points (RAP) subpictures and other subpictures may vary for each sublayer. In FIG. 13, the interval between random access point subpictures of Sublayer #1 is three subpictures, and the interval for Sublayer #2 is five subpictures. In this example, when displaying a picture made up of multiple subpictures belonging to different sublayers, the reference structure between and/or the encoding/decoding order of the subpictures for each sublayer will be considered.

As an example, when simultaneously displaying all subpictures included in each picture, starting from a picture with a specific picture ID, the video decoding apparatus may delay the displaying until all the subpictures with the same picture ID as the random access point subpicture closest in display order to the picture with the specific picture ID have been decoded. For example, in FIG. 13, a subpicture of Dec. no. 2 of Sublayer #1 shares the same picture ID with the subpicture of Dec. no. 4 of Sublayer #2 according to the display order. The two sublayers have different decoding orders depending on their reference structure. Therefore, the displaying of the random access point picture, starting from the corresponding picture ID, should be delayed until the subpicture of Dec. no. 4 of Sublayer #2 has been decoded. As such, when multiple sublayers are decoded in different reference structures, the displaying may be delayed until one picture has been fully decoded.

As another example, a picture ID from which displaying is to be started may be derived by using the interval between random access point subpictures of each sublayer. For example, in FIG. 13, the interval between random access point subpictures of Sublayer #1 is three subpictures, and the interval for Sublayer #2 is five subpictures. Thus, the two sublayers may have a random access point subpicture with the same picture ID, for every 15 subpictures. In some embodiments, if the two sublayers have different reference structures, a random access point at a picture level may be limited to where the subpictures of both of the two sublayers become a random access point simultaneously. Information on its interval may be derived by the intervals between random access subpictures of the two layers.

In other embodiments of the present disclosure, a bitstream transmitted by the video encoding apparatus may be partitioned into a plurality of sub-bitstreams which respectively correspond to sublayers. That is, a sub-bitstream corresponding to a specific sublayer alone may be extracted from the bitstream transmitted by the video encoding apparatus. The video decoding apparatus may decode the sub-bitstream corresponding to the specific sublayer. In this case, some syntax elements in a high-level syntax structure (such as SPS or PPS) of the sub-bitstream may be created or modified by using the high-level syntax elements in the bitstream. For example, since the sub-bitstream is data created by encoding subpictures, a syntax element for a picture size to be included in the sub-bitstream should be modified to indicate the size of the subpictures. The size of the subpictures may be calculated by using subpicture layout information included in the bitstream transmitted by the video encoding apparatus. The syntax element for the picture size to be included in the sub-bitstream is modified to the calculated size of the subpictures.

It should be understood that the above-described exemplary embodiments can be implemented in many different ways. The functions described in one or more examples may be implemented in hardware, software, firmware, or any combination of the above. The functional components described in this specification have been labeled as units in order to more particularly emphasize their implementation independence.

Meanwhile, various methods or functions described in the present disclosure may be implemented with instructions stored in a non-transitory recording medium which may be read and executed by one or more processors. The non-transitory recording medium includes, for example, all types of recording devices in which data is stored in a form readable by a computer system. For example, the non-transitory recording medium includes storage media such as an erasable and programmable read only memory (EPROM), an electrically erasable and programmable read-only memory (EEPROM), a flash drive, an optical drive, a magnetic hard drive, and a solid state drive (SSD).

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A method for processing a bitstream generated by encoding a sequence of pictures each of which is partitioned into a plurality of subpictures, the method comprising:
    decoding, from a sequence parameter set referred to by all of the pictures belonging to the sequence, partitioning information indicating a partitioning structure in which the pictures belonging to the sequence are partitioned into the subpictures;
    wherein the partitioning structure defined by the partitioning information is identical for all of the pictures in the sequence; and
    wherein the partitioning information includes size information of the subpictures and position information of the subpictures;
    decoding ID information for the subpictures, which is constructed to allow for mapping of different IDs to co-located subpictures that have a same position within different pictures belonging to the sequence, to map an ID to each of the subpictures; and
    reconstructing blocks within at least one subpicture corresponding to a mapped ID;
    wherein decoding the ID information comprises:
        decoding a syntax element indicating whether ID mapping applies on a sequence level or not;
        when the syntax element indicates that the ID mapping applies on the sequence level, decoding the ID information from the sequence parameter set and thereby mapping the same ID to the co-located subpictures within all of the pictures belonging to the sequence; and
        when the syntax element indicates that the ID mapping does not apply on the sequence level, decoding the ID information from a picture parameter set referred to by one or more pictures belonging to the sequence and thereby mapping the same ID to the co-located subpictures within pictures referring to the picture parameter set.

2. The method of claim 1, further comprising decoding information on the size of basic units,
wherein the size information comprises the number of basic units in horizontal and vertical directions of each of the subpictures.

3. The method of claim 2, wherein the position information is information for identifying a basic unit positioned at the top left or bottom right of each subpicture.

4. The method of claim 1, further comprising:
extracting, from the bitstream, a sub-bitstream corresponding to subpictures at the same location or with the same ID within the pictures belonging to the sequence; and
modifying high-level syntaxes of the sub-bitstream by using high-level syntaxes included in the bitstream.

5. A video encoding method for encoding a sequence of pictures each of which is partitioned into a plurality of subpictures, the method comprising:
encoding, into a sequence parameter set referred to by all of the pictures belonging to the sequence, partitioning information for indicating a partitioning structure in which the pictures belonging to the sequence are partitioned into the subpictures;
wherein the partitioning structure defined by the partitioning information is identical for all of the pictures in the sequence; and
wherein the partitioning information includes size information of the subpictures and position information of the subpictures;
encoding ID information for the subpictures which is constructed to allow for mapping of different IDs to co-located subpictures that have a same position within different pictures belonging to the sequence; and
encoding blocks within at least one subpicture corresponding to a mapped ID;
wherein encoding the ID information comprises:
encoding a syntax element indicating whether ID mapping applies on a sequence level or not;
when the syntax element indicates that the ID mapping applies on the sequence level, encoding the ID information into the sequence parameter set, for indicating that the same ID is mapped to the co-located subpictures within all of the pictures belonging to the sequence; and
when the syntax element indicates that the ID mapping does not apply on the sequence level, encoding the ID information into a picture parameter set which is referred to by one or more pictures belonging to the sequence, for indicating that the same ID is mapped to the co-located subpictures within pictures referring to the picture parameter set.

6. The method of claim 5, further comprising encoding information on the size of basic units,
wherein the size information comprises the number of basic units in horizontal and vertical directions of each of the subpictures.

7. The method of claim 6, wherein the position information is information for identifying a basic unit positioned at the top left or bottom right of each subpicture.

8. A method for transmitting a bitstream containing encoded video data, the method comprising:
generating the bitstream by encoding a sequence of pictures each of which is partitioned into a plurality of subpictures;
transmitting the bitstream to a video decoding apparatus;
wherein generating the bitstream comprises:
encoding, into a sequence parameter set referred to by all of the pictures belonging to the sequence, partitioning information for indicating a partitioning structure in which the pictures belonging to the sequence are partitioned into the subpictures;
wherein the partitioning structure defined by the partitioning information is identical for all of the pictures in the sequence; and
wherein the partitioning information includes size information of the subpictures and position information of the subpictures;
encoding ID information for the subpictures which is constructed to allow for mapping of different IDs to co-located subpictures that have a same position within different pictures belonging to the sequence; and
encoding blocks within at least one subpicture corresponding to a mapped ID;
wherein encoding the ID information comprises:
encoding a syntax element indicating whether ID mapping applies on a sequence level or not;
when the syntax element indicates that the ID mapping applies on the sequence level, encoding the ID information into the sequence parameter set, for indicating that the same ID is mapped to the co-located subpictures within all of the pictures belonging to the sequence; and
when the syntax element indicates that the ID mapping does not apply on the sequence level, encoding the ID information into a picture parameter set which is referred to by one or more pictures belonging to the sequence, for indicating that the same ID is mapped to the co-located subpictures within pictures referring to the picture parameter set.

* * * * *